United States Patent [19]

Steele

[11] 4,043,460

[45] Aug. 23, 1977

[54] TRAY STACKING AND UNSTACKING APPARATUS

[75] Inventor: Bruce B. Steele, Rochester, N.Y.

[73] Assignee: Eastman Kodak Company, Rochester, N.Y.

[21] Appl. No.: 647,843

[22] Filed: Jan. 9, 1976

[51] Int. Cl.$^2$ ............................................. B65G 60/00
[52] U.S. Cl. ............................... 214/6 BA; 214/6 TS; 214/8.5 K
[58] Field of Search ............... 214/6 BA, 6 TS, 8.5 K; 221/210, 223, 236

[56] References Cited

U.S. PATENT DOCUMENTS

| | | | |
|---|---|---|---|
| 3,043,476 | 7/1962 | Zwarycz | 214/8.5 K X |
| 3,401,808 | 9/1968 | Kemp | 214/6 BA |
| 3,752,361 | 8/1973 | Van Linder et al. | 214/8.5 K X |
| 3,765,546 | 10/1973 | Westerling | 214/6 BA |
| 3,782,591 | 1/1974 | Fries | 214/8.5 K X |
| 3,858,732 | 1/1975 | Kemper | 214/8.5 K |
| 3,884,366 | 5/1975 | Leenaards | 214/6 BA |

*Primary Examiner*—L. J. Paperner
*Attorney, Agent, or Firm*—S. W. Gremban

[57] ABSTRACT

An apparatus for stacking or unstacking trays comprising a tray holding mechanism and a drive member for moving the tray holding mechanism from an initial position along a prescribed closed path. In the stacking mode of operation, upon movement along the path, the tray holding mechanism moves downwardly depositing a first tray held thereby onto a second tray previously supplied to a receiving station on a tray support platform such as a conveyor. Continued movement along the path causes the tray holding mechanism to engage the second tray and to raise the stacked first and second trays to permit a third tray to be supplied to the receiving station by the conveyor. This sequence is continued until as many trays as desired are stacked. Alternatively, the disclosed apparatus may be switched to an unstacking mode wherein trays are deposited in succession from a stack to the receiving station on the conveyor.

6 Claims, 8 Drawing Figures

STACKING

UNSTACKING

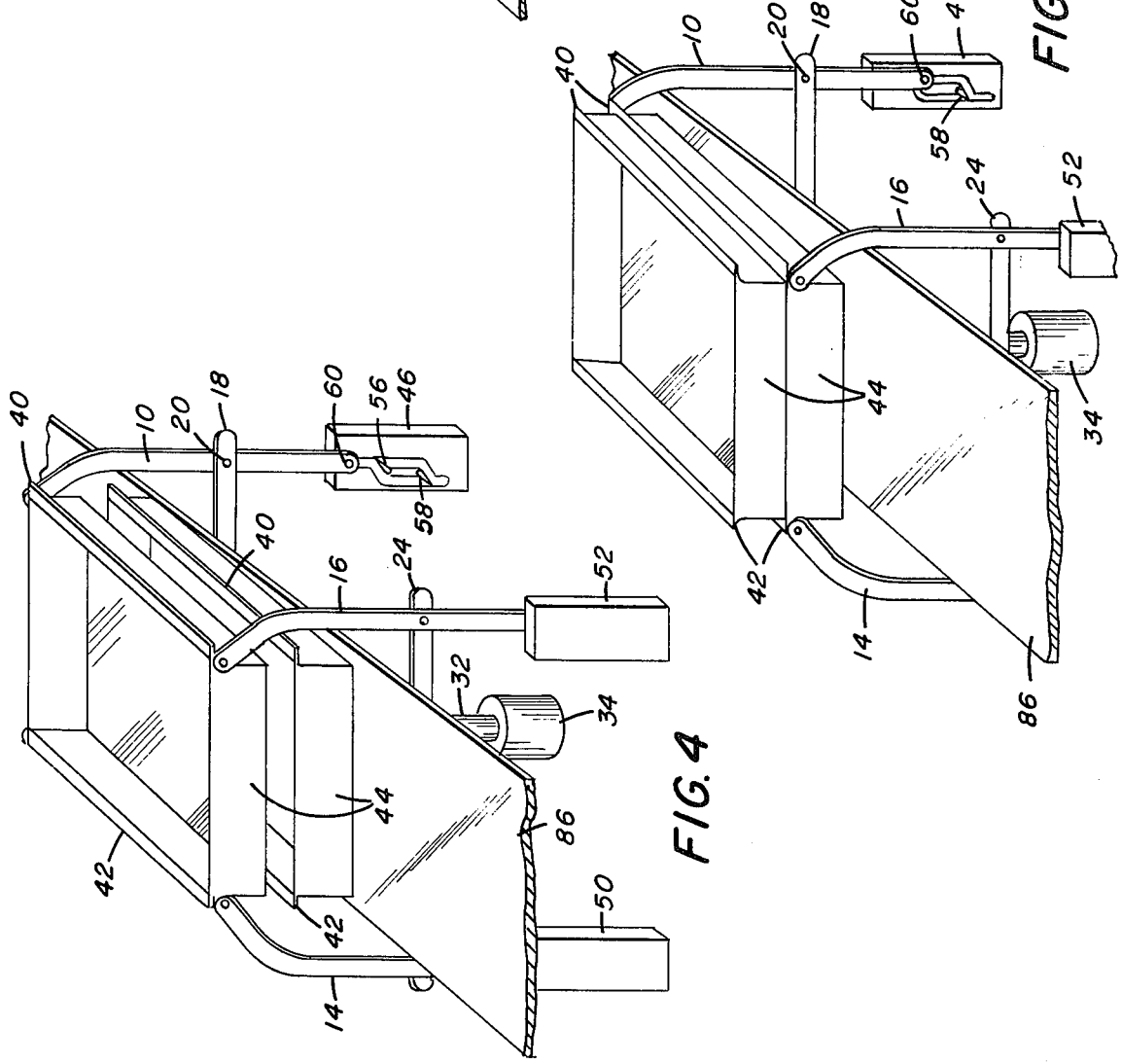

TRAY STACKING AND UNSTACKING APPARATUS

BACKGROUND OF THE INVENTION

1. Field of the Invention

The present invention relates to apparatus for stacking or unstacking trays, and more particularly to stacking or unstacking trays from a receiving station on a tray support platform such as a conveyor.

2. Description of the Prior Art

Various apparatus have been proposed for stacking and/or unstacking articles at an operating station on a conveyor. U.S. Pat. No. 2,550,587 discloses a box stacking apparatus comprising a supporting table and means for moving a box onto the table. Lifting means are provided to engage and lift the box from the table to a position whereat a pair of stack supporting arms engage the box. The lifting means then release the box which remains engaged by the supporting arms. A timing mechanism causes the lifting means to reciprocate unitl a desired number of boxes have been stacked.

U.S. Pat. No. 3,401,808 discloses apparatus for stacking pallets. The disclosed apparatus comprises a conveyor for moving pallets into a magazine. A vertically movable carriage is mounted to each side of the magazine and at least one pallet-supporting arm is pivotally mounted on each of the carriages. The pallet-supporting arms are pivotably movable into and out of engagement with the opposite sides of a pallet. When a first pallet is supplied by the conveyor the pallet-supporting arms pivot to engage the pallet and under the influence of the vertically moving carriages raise the pallet from a conveyor. As a second pallet is supplied to the magazine by the conveyor, the carriages lower the previously engaged first pallet onto this second pallet. The pallet-supporting arms then disengage the first pallet and move downwardly and inwardly to engage the second pallet. The carriages then raise the pallet-supporting arms causing both the first and second pallets to be raised. This sequence of events is continued until as many pallets are stacked as is desired.

U.S. Pat. No. 3,765,546 discloses apparatus for automatically stacking or unstacking relatively heavy containers. A conveyor supplies the containers to the stacking (or unstacking) apparatus. The apparatus comprises a pair of upright posts arranged at opposite sides of the conveyor. Carriages are mounted for vertical travel on the posts and carry levers pivotably movable between a first position for engaging the containers and a second position for disengaging the containers. The carriages move up and down the posts under the influence of a motor. As the containers are supplied in succession to the stacking apparatus, the levers pivot to the first position and engage the first container. The carriages travel vertically and thus the first container is raised above the conveyor. A second container is then positioned underneath the first container and the first container is lowered onto the second container. The levers then pivot to the second position and disengage the first container, and move to a position whereat the levers pivot to the second position and engage the second container. Once again, the carriages move vertically thereby lifting the first and second containers. This processs is repeated until stacking is complete.

U.S. Pat. Nos. 2,251,197, 2,447,959, and 3,858,732 disclose stacking and/or unstacking apparatus comprising raising and/or lowering members operated through linkage means by some form of eccentric cam means.

All of the aforementioned stacking and/or unstacking apparatus are of relatively complicated construction involving many interacting parts taking up considerable space. The attractiveness of a stacking (or unstacking) apparatus is directly related to its simplicity of design and cost of manufacture. Thus it is desirable to have stacking apparatus capable of achieving the stacking or unstacking functions discussed above while not sacrificing simplicity or cost.

SUMMARY OF THE INVENTION

The present invention relates to tray stacking/unstacking apparatus for use with tray supply or removing means such as a conveyor. In the stacking mode, the supply means supplies a succession of trays to a receiving station of the tray stacking apparatus. In one embodiment, the tray stacking apparatus comprises a tray holding means for engaging the holding a tray supplied by the supply means. Moving means are provided for reciprocally moving the tray holding means, and guide means define a closed path along which the tray holding means is moved. In operation, movement of the tray holding means from an initial position downwardly along the closed path causes the tray holding means to deposit a first tray held thereby onto a second tray supplied to the receiving station by the supply means. The tray holding means then disengages the first tray, moves downwardly and laterally into engagement with the second tray, and then raises the stacked first and second trays to permit a third tray to be delivered to the receiving station under the second tray. This sequence of steps is continued until as many trays are stacked as desired.

Upon reversing the direction that the tray holding means moves along the closed path from its initial position, the stacking apparatus becomes an unstacking apparatus. In this application, a stack of trays is supported by the tray holding means which lowers the entire stack on the conveyor operating as a tray removing means at the receiving station. The tray holding means then disengages the lower tray of the stack and upon upward and lateral movement engages the tray directly above it. The tray holding means then raises all of the trays in the stack except for the lowest one which remains on the conveyor. The conveyor then transports the tray from under the stack of trays leaving the tray holding means free to deposit the next tray upon the conveyor. In this manner, the stacked trays may be individually deposited on the conveyor at the receiving station and removed therefrom.

BRIEF DESCRIPTION OF THE DRAWINGS

In the detailed description of the preferred embodiments of the invention presented below, reference is made to the accompanying drawings, in which:

FIGS. 4, 5 and 6 show perspective views of the tray stacking/unstacking apparatus during various stages of the tray stacking operation.

DESCRIPTION OF THE PREFERRED EMBODIMENTS

Because general mechanical apparatus are well known, the present description will be directed in particular to elements forming part of, or cooperating more directly with, tray stacking/unstacking apparatus in accordance with the present invention. It is to be understood that mechanical apparatus not specifically shown or described may take various forms well known to those having skill in the art.

Throughout the specification and the accompanying claims, the word "tray" is frequently used and it is to be understood that the word tray is meant to encompass a wide class of receptacles, containers, bins, tanks, etc., which do not necessarily have a low rim such as is usually implied in the word "tray". The intended scope of the word "tray" is apparent from the context in which it is used.

Figure 1:
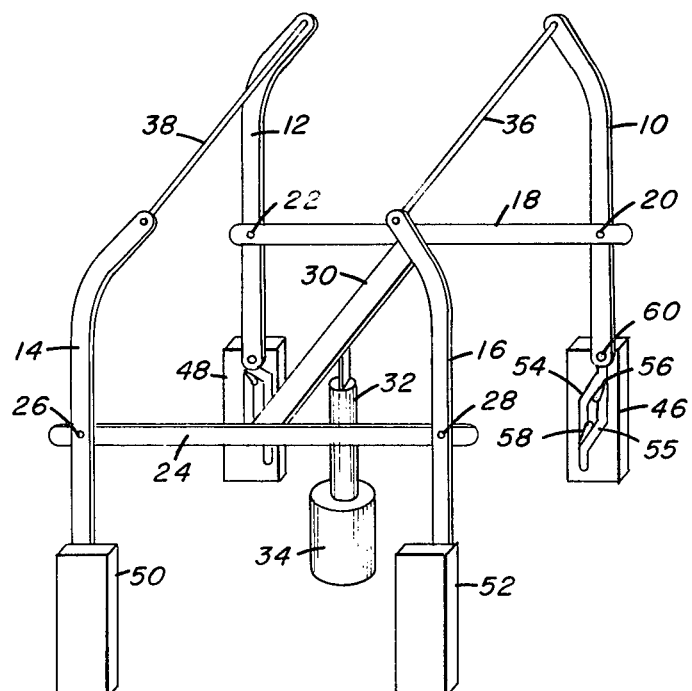
FIG. 1 shows a perspective view of a tray stacking/unstacking apparatus which is a presently preferred embodiment of the present invention.

Referring now to FIG. 1, the tray stacking/unstacking apparatus shown comprises two major subassemblies-tray holding means and guide means along which the tray holding means is movable. The tray holding means comprises four pivot members 10, 12, 14 and 16; the pivot members 10 and 12 being pivotally mounted to a cross member 18 by pivot pins 20 and 22 respectively, and the pivot members 14 and 16 being pivotally mounted to a cross member 24 by pivot pins 26 and 28 respectively. The cross members 18 and 24 are connected by a support member 30 which is itself connected to a pneumatically controlled air piston 32 for raising and lowering the tray holding means. The air piston 32 is slidable in and out of a cylinder housing 34 under the influence of compressed air in the cylinder housing 34. It will be apparent to those skilled in the art that numerous alternatives exist for performing the functions of the air piston 32 and cylinder housing 34. For example, an electric motor may be used to raise and lower the tray holding means via the support bar 30, or the tray holding means can be raised and lowered manually through the use of ropes, etc.

Figure 2:
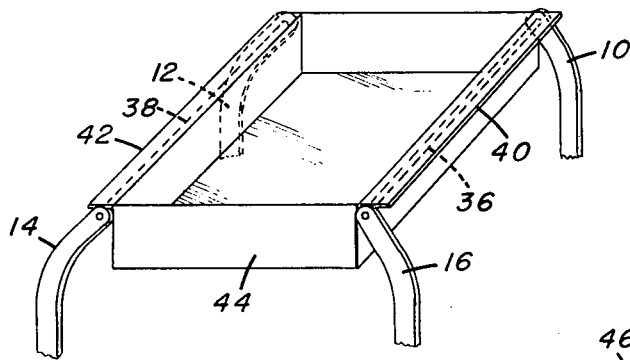
FIG. 2 is a segmental portion of the apparatus of FIG. 1 showing how a tray is supported by the stacking apparatus of FIG. 1.

The pivot members 10 and 16 mutually support a tray holding rod 36 and the pivot members 12 and 14 likewise support a tray holding rod 38. The purpose of the tray holding rods 36 and 38 is to engage a pair of flanges 40 and 42 of a tray 44 as shown in FIG. 2.

As previously stated, the second major subassembly of the tray stacking/unstacking apparatus is the guide means along which the tray holding means is movable. The guide means comprise four stationary guide blocks 46, 48, 50 and 52 for guiding one of the ends of the pivot members 10, 12, 14 and 16 respectively when the tray holding means is raised or lowered under the influence of air piston 32. Since each of the guide blocks 46, 48, 50 and 52 are similar in form and function, only guide block 46 and its operation will be discussed in detail.

Figure 3:
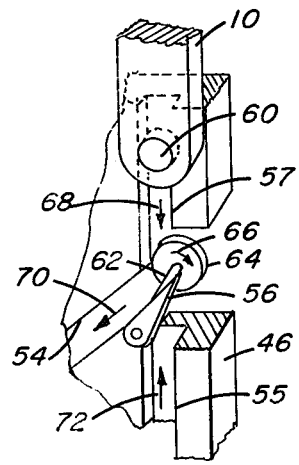
FIG. 3 is a segmental detail drawing showing how a spring bias is applied to a guide lever employed in the tray stacking/unstacking apparatus shown in FIG. 1.
Figure 3A:
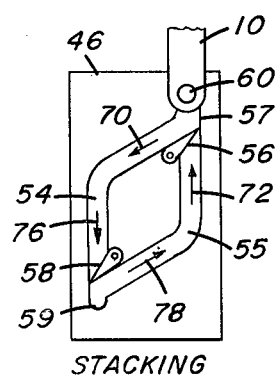
FIG. 3a is a frontal plan view of a guide block showing the position of the guide levers and the direction of movement of the tray holding means in its stacking mode.
Figure 3B:
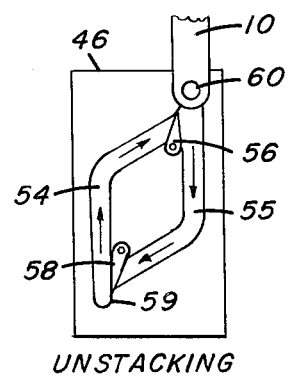
FIG. 3b is a frontal plan view similar to FIG. 3a showing the position of the guide levers and direction of movement of the tray holding means in its unstacking mode.

As seen from FIGS. 3, 3a and 3b, guide block 46 has a pair of guide channels 54, 55 merging at each end to common guide channels 57, 59, to form a closed path, and a pair of spring biased guide levers 56 and 58 pivotally mounted on block 46 at the intersections of channels 54, 55. One end of pivot member 10 is equipped with a guide pin 60 which rides within the guide channels. Thus, as the air piston 32 lowers and raises the tray holding means through a cycle of operation, the engagement of guide pin 60 with the guide channels causes pivot member 10 to pivot in a direction and an amount determined by the direction of travel of guide pin 60 around the closed path, i.e., which one of the channels 54, 55 or path the guide pin 60 follows in travelling from channel 57 to and from channel 59. The channel or path the guide pin 60 follows is dependent upon the position of the spring biased guide levers 56 and 58. FIG. 3 is a detail drawing showing one method of spring biasing guide lever 56. Here, guide lever 56 is fixedly attached to one end of a rod 62, and a torsion spring 64 at the other end of rod 62 tends to rotate the rod and guide lever 56 in a clockwise direction as indicated by an arrow 66. The guide lever 56 thereby rotates in the clockwise direction until it is prevented from doing do by coming into contact with a portion of a wall of guide channel 55. Still referring to FIG. 3, if guide pin 60 moves toward guide lever 56 in a direction indicated by an arrow 68, guide pin 60 will be deflected by lever 56 to move along guide channel 54 in a direction as indicated by an arrow 70. However, if guide pin 60 approaches guide lever 56 from the direction indicated by an arrow 72, guide pin 60 will pivot lever 56 in a counter-clockwise direction and advance past the lever assuming guide pin 60 has sufficient thrust to overcome the clockwise spring bias of spring 64.

Referring to block 46 with levers 56, 58 arranged in a stacking mode illustrated in FIG. 3a, as air piston 32 lowers the tray holding means from its initial position in which pin 60 is nested in channel 57, the action of guide lever 56, as previously discussed, causes guide pin 60 to travel downwardly and laterally along one path or guide channel 54 in a direction indicated by arrow 70. Movement of guide pin 60, and thus the corresponding end of pivot member 10, causes pivot member 10 and rod 36 to pivot in a clockwise direction about pivot pin 20. Continued advancement along guide channel 54 results in a vertically downward movement of member 10 in the direction of an arrow 76. In a manner exactly similar to that of guide lever 56, the guide lever 58 offers only the resistance of its spring bias to the advancing guide pin 60. The air piston 32 is of sufficient power to enable guide pin 60 to easily pivot guide lever 58 and pass thereby. As the air piston 32 reverses the direction of motion and raises the tray holding means, guide lever 58 causes guide pin 60 to advance upwardly and laterally along a different path or guide channel 55 in the direction indicated by an arrow 78. Motion in this direction causes pivot member 10 and rod 36 to pivot in a counterclockwise direction. Continued movement of the tray holding means by air piston 32 results in a vertically upward movement of member 10 in the direction of arrow 72, past guide lever 56, until finally the initial position as shown in FIG. 3a is obtained. The block 46 with levers 56, 58 arranged in an unstacking mode is illustrated in FIG. 3B. In this unstacking mode of operation, it is clear that the direction of travel of pin 60 as it traverses the closed path through a cycle of operation is reversed from the direction travelled in the stacking mode.

Concerning the mechanical operation of the tray stacking/unstacking apparatus, from FIGS. 4, 5 and 6 it is apparent how the stacking/unstacking operation proceeds. First, with reference to such figures, a cycle of operation of the apparatus in the stacking mode will be considered. FIG. 4 shows the tray stacking apparatus in an initial position (pins 60 nesting in channels 57) with the tray holding means supporting an upper tray 44 above a lower tray 44 supplied to the tray receiving station by a conveyor 86. As the tray holding means is lowered by air piston 32, the upper tray is initially deposited upon the lower tray. As previously discussed, the movement of guide pin 60 of pivot member 10 along guide channel 54 (and similar movement for each of the other pivot members 12, 14 and 16) causes the tray holding means to "open" to a position in which rods 36 and 38 are disengaged from upper tray 44, thereby leaving the upper and lower trays stacked on top of each other and the tray holding means in the position shown in FIG. 5. Now air piston 32 raises the tray holding means consequently causing the tray holding means to assume a closed position via pins 60 and channels 55 causing rods 36, 38 to move underneath flanges 40, 42 respectively of the lower tray. Continued upward vertical movement of the tray holding means raises the stacked upper and lower trays from conveyor 86 as shown in FIG. 6. When the tray holding means has fully raised the stacked upper and lower trays from conveyor 86, another tray may be supplied to the tray receiving station by the conveyor and added to the bottom of the stack by repeating the previously described stacking operation.

To change the tray stacking/unstacking apparatus from the stacking mode to the unstacking mode, it is only necessary to reverse the direction of the spring bias of each of the guide levers 56 and 58 as illustrated in FIG. 3b. Now the guide pins 60 will move along the guide channels 54, 55 in the opposite direction from FIG. 3a as indicated by the arrows thereby reversing the sequence of operations described in FIGS. 4, 5, and 6. In one possible arrangement, not illustrated, the guide levers can be linked by any suitable linkage to a solenoid, and would normally be biased to one mode of operation. When the other mode of operation is desired, the solenoid would be energized causing the guide levers to be moved and held in the proper position for achieving the other mode of operation.

In the unstacking mode of operation, in one cycle of operation a stack of trays 44 originally supported by the tray holding means will be lowered onto a tray support such as the conveyor 86 and released; and then the entire stack minus the bottom tray will be raised from the conveyor thereby permitting the conveyor to remove this tray from under the stack. This sequence of events is repeated until as many of the stacked trays are unstacked as desired. More specifically, with reference to FIG. 3b, the tray holding means is initially move downwardly causing pins 60 to move vertically downwardly in channels 55 until the bottom tray 44 of a stack of trays resting on rods 36, 38 is deposited onto the conveyor 86. Continued downward movement of the tray holding means causes pins 60 to move downwardly and laterally along channels 55 and then vertically downwardly in channels 59 for disengaging rods 36, 38 from the flanges of the tray as seen in FIG. 5. Upward movement of the tray holding means causes pins 60 to move vertically upwardly in channels 54 with rods 36, 38 disengaged from the stack of trays. When rods 36, 38 are raised above the flanges 40, 42 of the bottom tray, the pins 60 move upwardly and laterally in channels 54 causing rods 36, 38 to move underneath flanges 40, 42 respectively of the next to bottom tray. Further upward movement of the tray holding means causes pins 60 to move vertically upwardly in channels 57 (see FIG. 4) resulting in rods 36, 38 engaging flanges 40, 42 respectively of the next to bottom tray 44 and raising that tray and any additional trays stacked thereon above the bottom tray. The bottom tray 44 is then free to be removed.

The invention has been described in detail with particular reference to preferred embodiments thereof, but it will be understood that variations and modifications can be effected within the spirit and scope of the invention. For example, rather than having trays with flanges which are engaged by holding bars, trays could be used having indentations therein and the tray holding member would be provided with matched protrusions to engage the indentations in the tray. Numerous other possibilities exist for engaging the tray with the tray holding member.

I claim:

1. Tray stacking apparatus for use with supply means supplying a succession of trays to a receiving station in said tray stacking apparatus, said apparatus comprising:

tray holding means for engaging and holding a tray supplied by the supply means, said tray holding means movable between a first position for engaging a tray and a second position for disengaging a tray;

moving means for reciprocally moving said tray holding means;

guide means for guiding a part of said tray holding means and defining a first and a second path along which said part of said tray holding means is sequentially moved by said moving means, movement of said part along said first path in one direction causing said tray holding means to deposit a first tray held thereby on a second tray supplied by said supply means to the receiving station, and movement of said part along said second path in the opposite direction causing said tray holding means to engage the second tray and to raise the stacked first and second trays thus allowing a third tray to be supplied to the receiving station by said supply means;

said first and second paths comprise first and second channels respectively, and said guide means includes pivotal levers at the junctions of said first and second channels for ensuring said part of said tray holding means moves along said first and second channels in proper sequence; and said pivotal levers are movable between a first position for directing said part of said tray holding means along said first channel and then said second channel, and a second position for directing said part of said tray holding means along said second channel and then said first channel, thereby enabling said apparatus to be used as a tray stacking apparatus when said pivotal levers occupy said first position and as a tray unstacking apparatus when said pivotal levers occupy said second position.

2. Apparatus as claimed in claim 1 wherein said tray holding means comprises a pair of holding arms movable between a first position for engaging a tray and a second position for disengaging a tray, movement of said part along said first channel causing said holding arms to lower the first tray and to move to said second position for disengaging the first tray for stacking the first tray upon the second tray, and movement of said part along said second channel causing said holding arms to move to said first position for engaging the second tray, and continued movement along said second channel causing said holding arms to raise the second tray with the first tray stacked thereon.

3. Tray unstacking apparatus for use with conveying means for conveying the trays from a tray receiving station of said tray unstacking apparatus, said apparatus comprising:
   tray holding means for engaging a first tray and supporting a plurality of trays stacked on the first tray, said tray holding means movable between a first position for engaging a tray and a second position for disengaging a tray;
   moving means for moving said tray holding means;
   guide means for guiding a part of said tray holding means a defining a first and a second path along which said part of said tray holding means is moved by said moving means, movement of said part along said second path in one direction causing said holding means to lower the first tray onto the conveying means at said tray receiving station, and continued movement of said part along said second path causing said holding means to move to said second position for disengaging the first tray, movement of said part of said tray holding means along said first path in the opposite direction causing said holding means to move to said first position to engage a second tray stacked on the first tray, and continued movement of said part along said first path while said holding means are in said first position causing said holding means to raise the second tray from the first tray, thereby unstacking the first and second trays;
   said first and second paths comprise first and second channels respectively, and said guide means include pivotal levers for ensuring said part of said tray holding means moves along said first and second channels in proper sequence; and
   said pivotal levers are movable between a first position for directing said part of said tray holding means along said first channel and then said second channel, and a second position for directing said part of said tray holding means along said second channel and then said first channel, thereby enabling said apparatus to be used as a tray stacking apparatus when said pivotal levers occupy said first position and as a tray unstacking apparatus when said pivotal levers occupy said second position.

4. Apparatus as claimed in claim 3 wherein said tray holding means comprises a pair of holding arms movable between a first position for engaging a tray and a second position for disengaging a tray, movement of said part of said tray holding means along said second channel in one direction while said holding arms are in said first position causes said holding arms to lower the first tray to the receiving station, and continued movement of said part along said second channel in said one direction causes said holding arms to move to said second position for disengaging the first tray, movement of said part of said tray holding means along said first channel in the opposite direction causes said holding arms to move to said first position to engage the second tray, and continued movement of said part along said first channel in said opposite direction causes said holding arms while in said first position to raise the second tray from the first tray, thereby unstacking the first and second trays.

5. Tray stacking apparatus for use with supply means supplying a succession of trays to a receiving station in said tray stacking apparatus, said apparatus comprising:
   tray holding means for engaging and holding a tray supplied by the supply means, said tray holding means movable between a first position for engaging a tray and a second position for disengaging a tray;
   moving means for reciprocally moving said tray holding means;
   guide means for guiding a part of said tray holding means and defining a first and a second path along which said part of said tray holding means is sequentially moved by said moving means, movement of said part along said first path in one direction causing said tray holding means to deposit a first tray held thereby on a second tray supplied by said supply means to the receiving station, and movement of said part along said second path in the opposite direction causing said tray holding means to engage the second tray and to raise the stacked first and second trays thus allowing a third tray to be supplied to the receiving station by said supply means;
   said first and second paths comprise first and second channels respectively, and said guide means include selector means at the junctions of said first and second channels for ensuring said part of said tray holding means moves along said first and second channels in proper sequence; and
   said selector means are movable between a first position for directing said part of said tray holding means along said first channel and then said second channel, and a second position for directing said part of said tray holding means along said second channel and then said first channel, thereby enabling said apparatus to be used as a tray stacking apparatus when said selector means occupy said first position and as a tray unstacking apparatus when said selector means occupy said second position.

6. Tray unstacking apparatus for use with conveying means for conveying the trays from a tray receiving station of said tray unstacking apparatus, said apparatus comprising:
   tray holding means for engaging a first tray and supporting a plurality of trays stacked on the first tray, said tray holding means movable between a first position for engaging a tray and a second position for disengaging a tray;
   moving means for moving said tray holding means;
   guide means for guiding a part of said tray holding means and defining a first and a second path along which said part of said tray holding means is moved by said moving means, movement of said part along said second path in one direction causing said holding means to lower the first tray onto the conveying means at said tray receiving station, and continued movement of said part along said second path causing said holding means to move to said second position for disengaging the first tray, movement of said part of said tray holding means along said first path in the opposite direction causing said holding means to move to said first position to engage a second tray stacked on the first tray, and continued movement of said part along said first path while said holding means are in said first position causing said holding means to raise the second tray from the first tray, thereby unstacking the first and second trays;

said first and second paths comprise first and second channels respectively, and said guide means include selector means for ensuring said part of said tray holding means moves along said first and second channels in proper sequence; and said selector means are movable between a first position for directing said part of said tray holding means along said first channel and then said second channel, and a second position for directing said part of said tray holding means along said second channel and then said first channel, thereby enabling said apparatus to be used as a tray stacking apparatus when said selector means occupy said first position and as a tray unstacking apparatus when said selector means occupy said second position.

* * * * *